United States Patent [19]

Athey et al.

[11] 3,846,615

[45] Nov. 5, 1974

[54] LIQUID TEMPERATURE CONTROL AND LOW LIQUID LEVEL DETECTOR

[75] Inventors: Stuart E. Athey; W. Edwin Thornburg, both of Troy, Ohio

[73] Assignee: The Hobart Manufacturing Company, Troy, Ohio

[22] Filed: Apr. 5, 1973

[21] Appl. No.: 348,193

[52] U.S. Cl............... 219/333, 134/57 D, 134/105, 219/322, 219/327
[51] Int. Cl.............................................. F24h 1/00
[58] Field of Search .......... 219/333, 334, 322, 327; 134/57 D, 57 R, 56 D, 56 R, 105; 68/15, 16

[56] References Cited
UNITED STATES PATENTS

| | | | |
|---|---|---|---|
| 2,568,474 | 9/1951 | VanSciver | 219/314 |
| 2,627,015 | 1/1953 | Hackman | 219/333 X |
| 3,103,575 | 9/1963 | Pecci | 219/333 X |
| 3,576,426 | 4/1971 | Sesholtz | 219/333 X |

Primary Examiner—C. L. Albritton
Attorney, Agent, or Firm—Biebel, French & Bugg

[57] ABSTRACT

A dishwasher includes a wash tank having means for heating a washing liquid in the tank, a temperature sensor arranged in the tank for controlling the heating means, and means for sensing that the liquid is above a predetermined level. The temperature sensor is a thermistor connected to a circuit for controlling the operation of the heating means. The control circuit will also disable the heating means should the thermistor become either open or shorted. The liquid level detector is a reed switch actuated by a magnet in a float. The reed switch is connected to the control circuit and will cause the heating means to be disabled should the liquid level fall below the temperature sensor. A time delay circuit is provided to prevent intermittent operation of the heating means due to turbulence of the surface of the liquid which causes the reed switch to open and close rapidly. The reed switch and thermistor are contained in a single housing within the wash tank. A light emitting diode is connected in the circuit to the heater means to indicate when it is operative.

13 Claims, 3 Drawing Figures

LIQUID TEMPERATURE CONTROL AND LOW LIQUID LEVEL DETECTOR

BACKGROUND OF THE INVENTION

In heating liquids, such as the washing solution used in a dishwasher, it is customary to use thermostatically controlled heating means including electric heaters controlled by electrical contactors, or gas or steam heaters controlled by solenoid operated valves.

It is essential that the temperature sensing element be located within the solution being heated so that it may sense accurately the temperature of the solution. If the liquid level falls below the temperature sensing element, then that element may sense the temperature of air and call for continuous opeation of the heater means.

Should the liquid level fall below that of the heater, which may happen in those installations where an electric heater, for example, is used and positioned near, but not at the bottom of the reservoir, the heater may be damaged by its continued operation in air, or it may be damaged by thermal shock if liquid were introduced into the reservoir after the heating elements were raised to an elevated temperature.

SUMMARY OF THE INVENTION

This invention relates to a liquid temperature control circuit and means for detecting liquid level. More particularly, this invention relates to a novel apparatus for use in determining a minimum level and temperature of a liquid in a reservoir, and to a solid state control circuit responsive to the temperature and level apparatus for controlling heating means within the reservoir.

In this invention, a reed switch and a thermistor are contained within a housing which is inserted into a liquid reservoir above the level of a heating means. A float assembly is attached to and suspends from the housing with the float containing a magnet. If the liquid level is at or above the level of the housing, the magnet will be brought in proximity to the reed switch, causing it to close, and will allow normal operation of the heater control circuit.

A thermistor within the housing is connected to a solid state control circuit which controls the heating means. Should the thermistor become either shorted or open, the heater means will be disabled. If the liquid level should fall below the thermistor, the heating means will be disabled. A time delay circuit is associated with the reed switch to prevent intermittent operation of the contactor supplying current to the heating means, or to the solenoid valve, in the case of gas or steam heat, in those cases where the liquid level is low, but not low enough to warrant removal of the heat and where turbulence on the surface of the liquid exists.

Accordingly, it is an object of this invention to provide an improved control circuit for use with a means for heating liquid contained within a reservoir wherein liquid temperature sensing means and liquid level sensing means are contained in a single housing, and wherein the heating means is disabled if the liquid level falls below the liquid temperature sensing means for longer than a predetermined time period.

It is also an object of this invention to provide an improved control circuit for controlling a heating means wherein a thermistor sensor is employed to maintain the liquid within a predetermined temperature range and which is failsafe in that the heating means is disabled if said thermistor becomes either open or shorted; and to provide a time delay means to prevent short term intermittent operation of the liquid level sensing means from disabling said heating means.

DESCRIPTION OF THE PREFERRED EMBODIMENT

Figure 1:
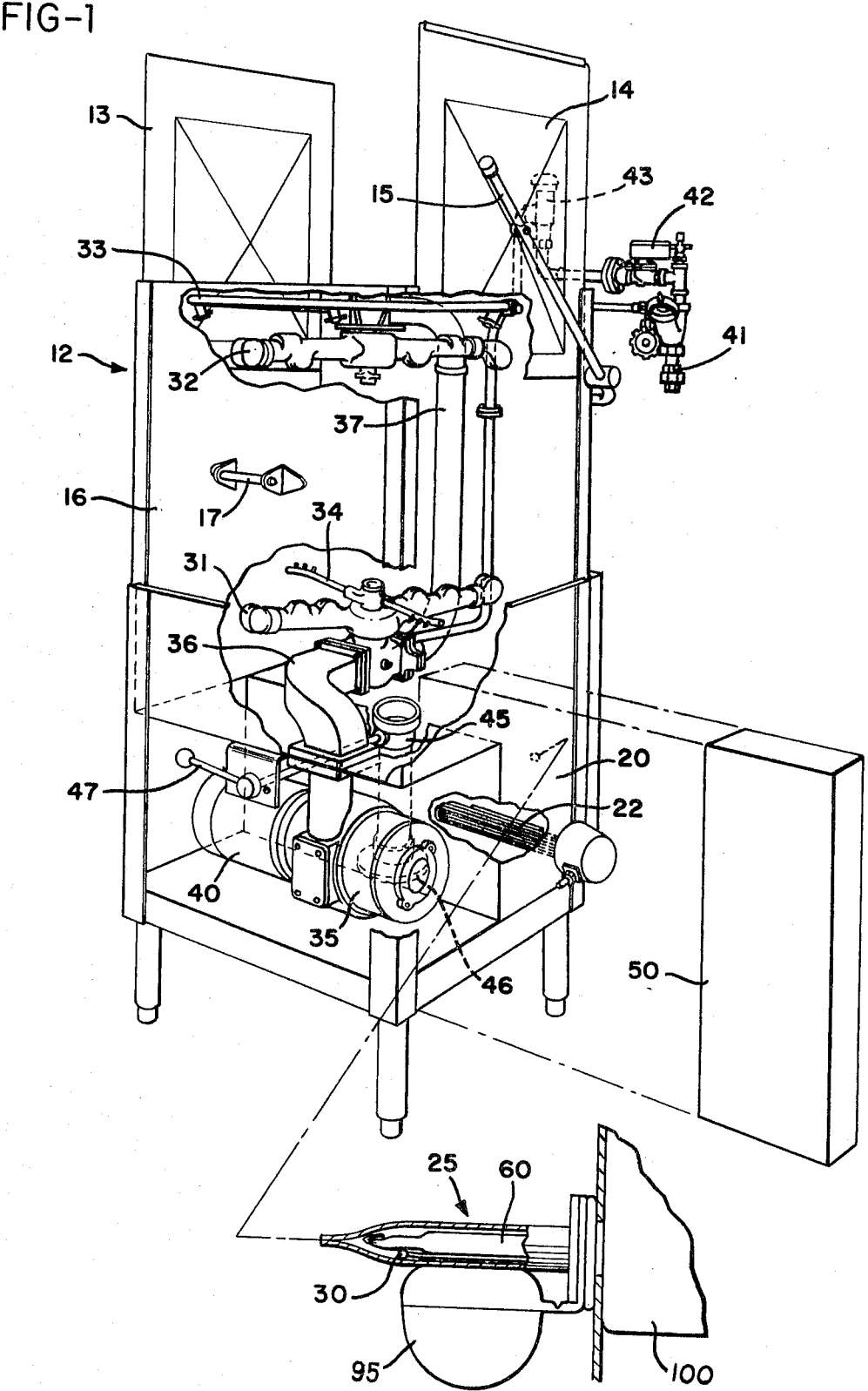
FIG. 1 is a perspective view, with a portion broken away to reveal internal components, of one type of dishwasher having a liquid reservoir including an electric heating means, temperature sensing and liquid level sensing means.

Referring now to the drawings, and particularly to FIG. 1, a semiautomatic, rack type commercial dishwasher 10 is shown which includes a wash chamber 12, entry to which is provided by doors 13 and 14 movable from a lower position to an upper position by means of a wrap around handle 15. A third door at the front of the dishwasher serves as an inspection door 16 and may be lifted by means of handle 17.

A liquid reservoir wash tank 20, located in a lower part of the dishwasher, is heated by means of an electric immersion heater 22. The water level is sensed by means of a float assembly 25, and the water temperature is sensed by means of a thermistor 30 built into the water level assembly. The wash tank 20 may also be heated by means of a gas fired burner located beneath the wash tank or by steam.

Within the washing chamber 12 are revolving wash arms 31 and 32 and rinse sprayers 33 and 34. The washing solution contained in the wash tank 20 is pumped to the wash arms 31 and 32 through manifolds 36 and 37 by means of a self-draining pump 35. The pump 35 is driven by an electric motor 40. Thus, the washing solution is continuously recirculated.

Rinse water is supplied through a connection 41 to the rinse sprayers 33 and 34 under the control of a rinse solenoid 42. A vacuum breaker 43 is provided on the downstream side of the rinse valve.

The wash tank may be filled initially by water from the rinse sprayers, and the excess water in the wash tank, due to the operation of the rinse sprayers, is removed by means of an overflow drain tube 45, the upper part of which is open and serves to limit the level of water in the wash tank. The lower part of the drain tube 45 fits within a drain assembly 46 at the lower part of the tank and is closed when the drain tube is in its lowermost position. The drain tube 45 may be raised by means of handle 47 which rotates a cam to lift the drain tube 45.

Figure 2:
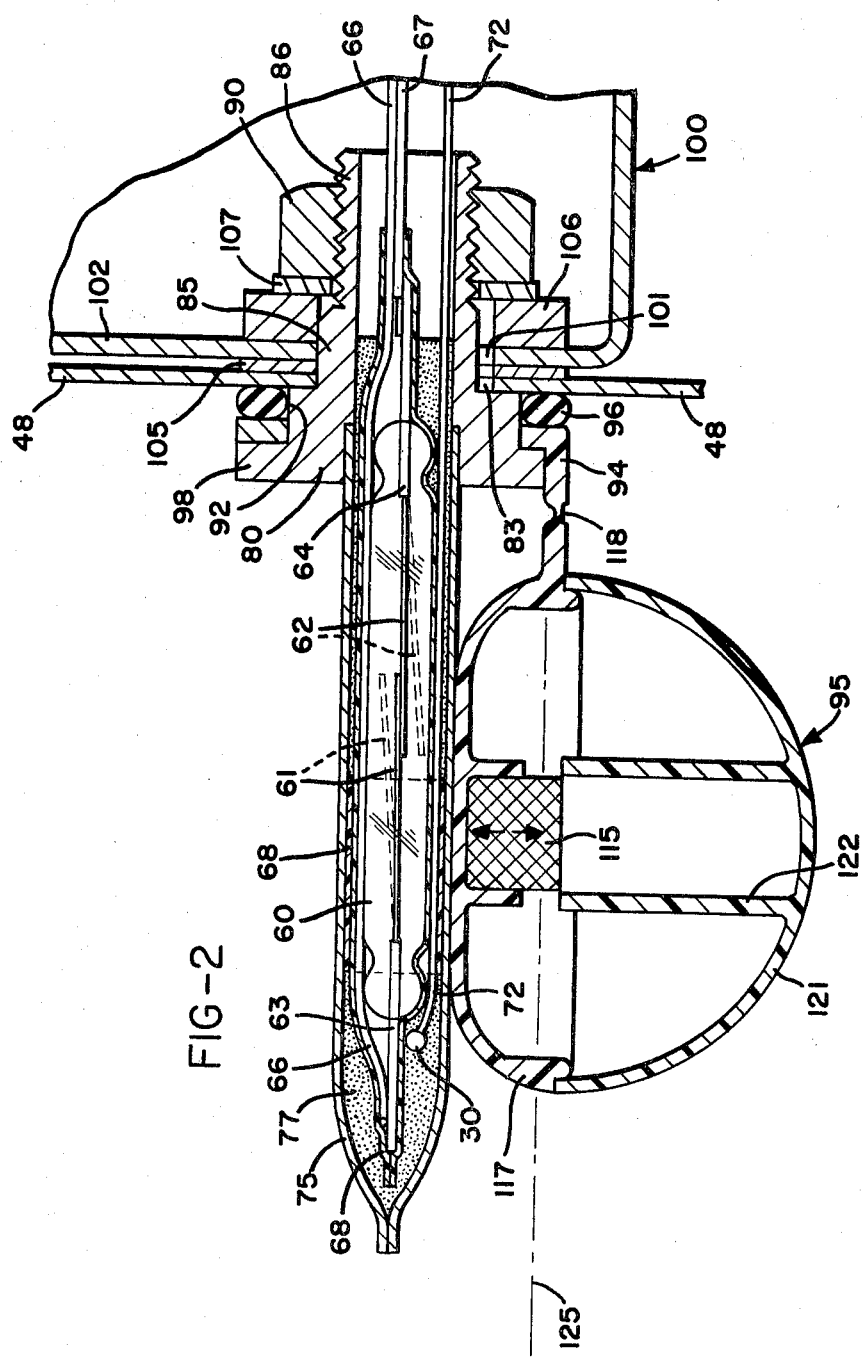
FIG. 2 is an enlarged cross sectional view of the liquid level sensing apparatus which includes a thermistor for sensing the temperature of the liquid.

The device 25 for sensing liquid level and temperature is mounted on a wall 48 above the level of the heater 22, and is shown in greater detail in FIG. 2. The device 25 provides control inputs to a control circuit within housing 50, the output of which is connected to the heater 22 and other components.

The sensor assembly 25 includes a reed switch 60 of conventional design having a pair of magnetizable reeds 61, 62 within a sealed glass enclosure. The reeds are secured to terminals 63, 64 extending outwardly from the glass tube and onto which are soldered wires 66 and 67 for connection with the control circuit. The reed switch and connecting wires are surrounded by a heat shrinkable plastic envelope 68.

The thermistor 30 is positioned adjacent the reed switch 60 and includes a pair of wires 72 which are also connected to the control circuit. The thermistor and the reed switch are mounted within a stainless steel housing or tube 75. A potting compound 77 fills the tube 75 to insure mechanical rigidity of the assembly, to render the assembly impervious to moisture, and to provide good thermal conductivity to the thermistor.

A mounting bolt 80 is provided with a two diameter internal opening, the larger diameter opening receiving the end of the tube 75, and the smaller diameter opening receiving the reed switch, thermistor, and associated connecting wires. The wall 48 of the tank 20 is provided with an opening 83 large enough to receive a shank portion 85 of the bolt 80. The end 86 of the bolt is threaded to receive a nut 90.

The bolt 80 includes a portion 92 which is larger in diameter than the shank portion 85 and also larger than the opening 83 in the wall. Onto this larger diameter portion 92 is mounted the retaining ring portion 94 of the float assembly 95 and an O-ring 96. An even larger diameter portion or lip 98 of the mounting bolt 80 engages the retaining ring portion 94 and the O-ring to hold them in compression against the wall 48, and therefore the axial length of the enlarged portion 92 is slightly less than the combined thicknesses of the ring 94 and the relaxed thickness of O-ring 96.

A connector box 100 is provided on the outside of the wall 48 and is held in place by the mounting bolt 80. This box includes an opening 101 in its rear wall 102 substantially the same diameter as the opening 83 in the wall. A sealing washer 105 is positioned over the shank 85 and between the wall 48 and the box 100. Finally, a compression washer 106 and a steel washer 107 are positioned between the lock nut 90 and the rear wall of the connector box 100.

The reed switch 60 is operated by a magnet 115 supported in the float assembly 95. The float assembly is made of a plastic material and includes an upper portion 117 which is integral with a molded hinge section 118 and the retaining ring portion 94. The bottom half 121 of the float assembly 95 is also made of plastic and is sealed to the upper half to form a watertight structure. Within the bottom half 121 of the float is a structure 122 which supports the magnet 115 in place near the upper surface of the float.

As the water level drops below the level of the tube 75, the float 95 will then fall away from the tube, allowing the reed dwitch contacts 61 and 62 to separate and signal a low water condition.

Since this apparatus is used principally in dishwashers of the type where water is continuously recirculated from the reservoir or wash tank through spray arms or heads, the surface of the water generally is never quiescent, and therefore even though the average water level may be below the tube 75, the thermistor 30 nevertheless will be submerged in the water for a long enough time to sense its temperature. However, the lower the water level, the less exposure the thermistor has to the water, and therefore when the water level falls below the dotted line 125 shown in FIG. 2, the contacts 61 and 62 will open to indicate a low water condition. As will be explained, only if the contacts remain open for longer than about five seconds will the control circuit disable the heater means.

Figure 3:
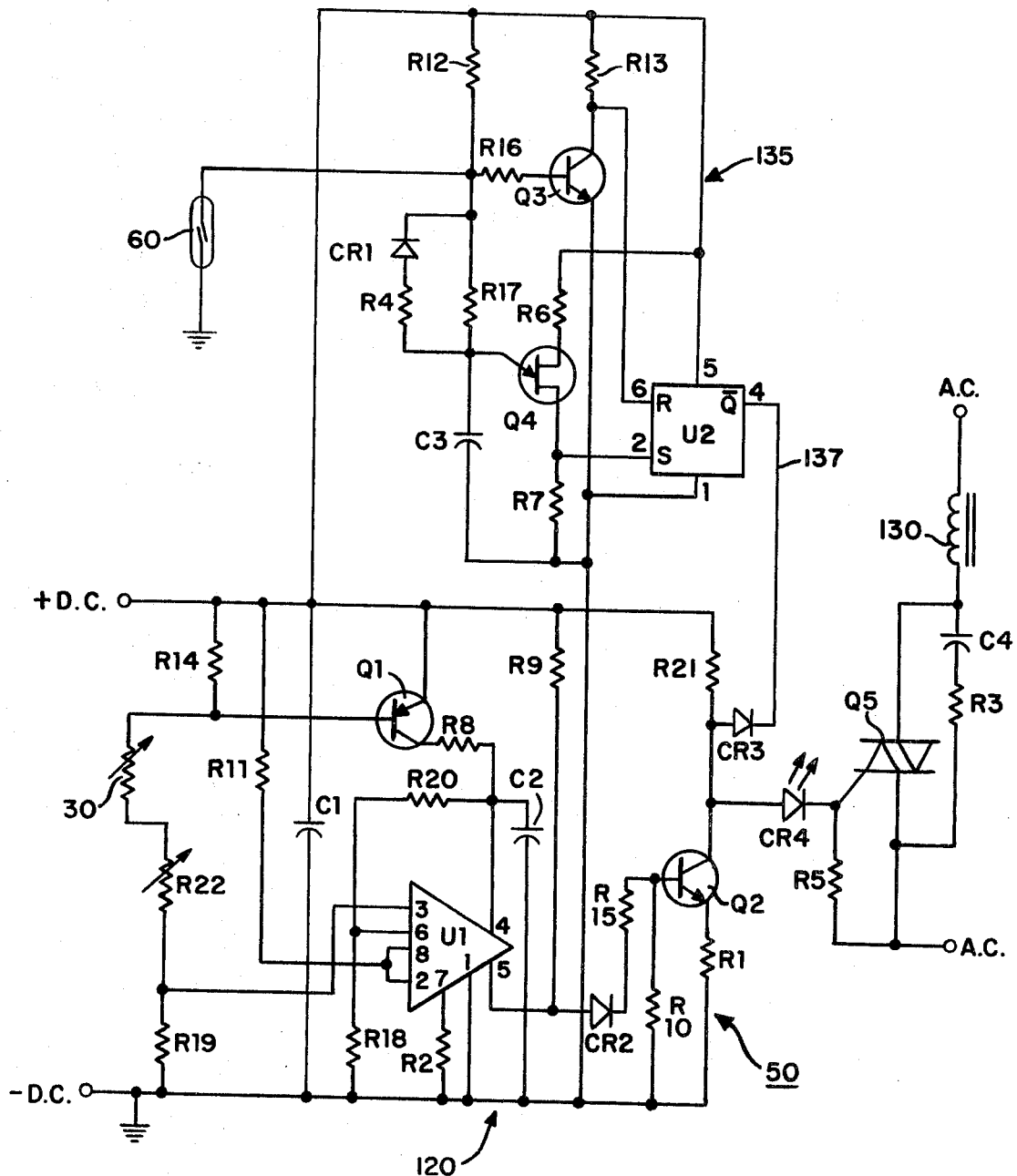
FIG. 3 is an electrical schematic diagram of a control circuit for controlling heating means in response to both a thermistor temperature sensor and a reed switch liquid level sensor.

Reference is now made to FIG. 3 and to the circuit diagram showing water temperature and level control circuit in the housing 50. This circuit serves two purposes, the first is to control water temperature, the second is to respond to water level. The selection of water temperature is accomplished by setting a potentiometer R22 mounted on the circuit board, with the temperature of the water being sensed by a thermistor 30. The thermistor 30, a negative temperature coefficient device, is connected to a water temperature control circuit 120 which includes a voltage divider (R22 and R19) connected to a voltage level sensing integrated circuit or differential amplifier U1, the output of which is connected to transistor driver Q2 to control the gate current of triac Q5. The triac supplies current for a contactor coil 130 which controls current to the electrical heater in an electrical heater embodiment of the invention or to a solenoid valve in an embodiment of the invention where gas or steam heat is used to raise the water temperature in the wash tank 20.

The thermistor 30 is connected in a voltage divider including potentiometer R22 and a precision resistor R19. The junction between R19 and R22 is connected as one input to a differential amplifier U1. This amplifier circuit is connected in a Schmitt trigger configuration.

Amplifier U1 includes three transistors and a diode on an integrated circuit chip. Two of these transistors have common emitters and are the ones used in the above Schmitt trigger connection. The third transistor is used as a current source. The diode is used to set the bias of the current source.

Resistor R11 is used to limit current to the base of the current source transistor in the integrated circuit U1. Resistors R8 and R9 are used to set the collector current through the other two transistors in the integrated circuit U1. Resistors R18 and R20 set the proper feedback for hysteresis in the integrated circuit U1.

Transistor Q2 is used to turn off gate current to the triac Q5 when the temperature sensed by the thermistor 30 is above a predetermined value and allows gate current to flow when the temperature sensed by the thermistor 60 is below a second predetermined value. Light emitting diode CR4 is used to indicate when gate current flows to the triac Q5 and therefore indicates when current is flowing in the heater circuit.

When the thermistor 30 senses an increase in temperature, its resistance will begin to decrease and the voltage applied to the input (pin 3) of integrated circuit U1 begins to increase. At a specified voltage level, which may be adjusted by potentiometer R22, this voltage will become high enough to turn on the first stage of the integrated circuit U1 causing pin 4 to go low and at the same time turning off the second stage within U1, causing pin 5 to go high. When pin 5 of U1 goes high, the transistor Q2 will turn on and thus remove gate current to the triac Q5 and turn off the heat controlled by the coil 130.

As the thermistor 30 begins to cool, it will not cause the heat to turn on at the same voltage level which caused the heat to turn off due to a hysteresis built into the circuit. This hysteresis is regulated by feedback resistors R18 and R20. Capacitor C2 renders the circuit less sensitive to noise from outside sources.

If thermistor 30 becomes open, no base drive will be available to transistor Q1 and therefore no collector current will flow through Q1 to U1. This will cause pin 5 to go high and gate transistor Q13 on to gate triac Q5 off. If the thermistor 30 becomes shorted, the input to U1 will be high enough to turn it on and the circuit will operate in the same manner as if the thermistor were heated, thus causing the triac Q5 to be turned off.

The water level reed switch 60 is operated by a magnet within the float and closes the reed switch 60 when the water level is above the minimum of the level necessary for proper operation of the dishwasher. The switch 60 protects the heaters from thermal shock and overheating by preventing heater operation when the water level is low. This is especially useful when the operator turns the heater switch on before filling the tank or where he drains the tank before turning off the heaters.

The reed switch 60, shown in FIG. 3, is connected to a time delay circuit 135 having an output 137 which can remove gate current from the triac Q5 whenever the water level is too low. A time delay circuit 135 has a built in time delay of approximately five seconds to prevent intermittent operation of the coil 130 under those conditions where the pump motor is running and the water level is low, but not low enough to warrant removing current from the heater, and causing turbulence sufficient to cause intermittent opening and closing of the reed switch contacts. Rapid on off switching of the heaters could cause the contactor associated with the coil 130 to wear out prematurely or cause the steam valve or gate valve associated with the coil 130 to wear out quickly.

The reed switch 60 is connected to the base of transistor Q3 through resistor R16. As long as the reed switch is closed, transistor Q3 is gated off causing flip-flop U2 to reset. Therefore, the $\overline{Q}$ output of the flip-flop U2 on line 137 is high thus allowing Q2 to control the gate current to triac Q5.

If the reed switch 60 opens, base current originating in resistor R12 will flow in transistor Q3 causing it to turn on. Also, capacitor C3 will charge through resistors R12 and R17. The time constant of this circuit is approximately five seconds. When the voltage on capacitor C3 reaches the triggering voltage of unijunction transistor Q4, this device will conduct and a pulse will be produced to set flip-flop U2. The Q output will go low and short to ground through diode CR3 any current flowing from resistor R21 to the gate circuit of triac Q5.

Diode CR1 and resistor R4 function to discharge rapidly capacitor C3 when the reed switch is closed to that capacitor C3 may begin charging from zero volts when the reed switch is next opened.

The following table gives the values and component designations for the various resistors, capacitors, diodes, transistors, and other components shown in FIG. 3.

TABLE I

| COMPONENTS | DESCRIPTION | | |
|---|---|---|---|
| R1 | 1 ohm | ±5% | ¼W Carbon Resistor |
| R2, R4 | 22 ohm | ±5% | ¼W Carbon Resistor |

TABLE I-Continued

| COMPONENTS | DESCRIPTION | | |
|---|---|---|---|
| R5, R6 | 1K ohm | ±5% | ¼W Carbon Resistor |
| R7 | 100 ohm | ±5% | ¼W Carbon Resistor |
| R8, R9, R11 | 3.9K ohm | ±5% | ¼W Carbon Resistor |
| R12 | 6.8K ohm | ±5% | ¼W Carbon Resistor |
| R13 | 10K ohm | ±5% | ¼W Carbon Resistor |
| R14, R16 | 27K ohm | ±5% | ¼W Carbon Resistor |
| R17 | 1M ohm | ±5% | ¼W Carbon Resistor |
| R10 | 2.7K ohm | ±5% | ¼W Carbon Resistor |
| R18 | 1.62K ohm | ±1% | ¼W Metal Film Resistor |
| R19 | 2.21K ohm | ±1% | ¼W Metal Film Resistor |
| R20 | 15.8K ohm | ±1% | ¼W Metal Film Resistor |
| R21 | 1K ohm | ±5% | ½W Carbon Resistor |
| R22 | 20K ohm | | ½W Variable Resistor |
| R3, R15 | 22K ohm | ±5% | ¼W Carbon Resistor |
| U1 | | | Differential Amplifier |
| U2 | | | Flip-Flop - RS |
| C1 | 0.1 mfd | | 50V Disc Capacitor |
| C2, C3 | 2.2 mfd | | 20V Tantalum Dipped Capacitor |
| C4 | .01 mfd | | 1.4KV Disc Capacitor |
| Q1 | | | Transistor - PNP |
| Q2, Q3 | | | Transistor - NPN |
| Q4 | | | Transistor - Unijunction |
| Q5 | | | Triac |
| CR1, CR2, CR3 | | | Diode |
| CR4 | | | Diode - Light Emitting |

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for maintaining an elevated temperature of a liquid comprising a reservoir adapted to contain the liquid to be heated, heating means in said reservoir, means positioned in said reservoir at a level above the level of said heating means including
means for sensing the temperature of said liquid including a thermistor whose electrical characteristics vary in accordance with temperature and
means for sensing that the liquid is above a predetermined level, and circuit means responsive to said temperature sensing means for controlling the operation of said heating means whereby to maintain the liquid within a predetermined temperature range, said circuit means being responsive to said liquid level sensing means and said temperature sensing means for disabling said heating means if the liquid level falls below said predetermined level or if said thermistor becomes either open or shorted.

2. The apparatus of claim 1 wherein said temperature sensing means and said level sensing means are contained within a single housing and are located above said heating means.

3. The apparatus of claim 3 wherein said circuit means further includes means for visually indicating when said heating means is operative.

4. The circuit means of claim 4 further including time delay means whereby momentary indications of low water level of less than a predetermined duration will not be operative to disable said heating means.

5. The apparatus of claim 1 wherein said liquid level detecting means includes a reed switch and a float mounted beneath said reed switch and containing a magnet to cause the contacts within said reed switch to close when said liquid level is sufficient to raise said float and said magnet into proximity to said reed switch.

6. In a dishwasher including
a washing chamber with a tank at its bottom for containing a quantity of washing solution,
means for heating the solution in said tank,
a temperature sensor arranged to respond to the temperature of the solution in said tank,
means for spraying the solution over articles supported in said washing chamber,
a pump connected to circulate solution from said tank through said spray means, and
means for spraying rinsing water over the articles after they have been sprayed with the washing solution,
the improvement comprising
means positioned in said tank for sensing that the quantity of washing solution is above a predetermined level, said means including said temperature sensor, and
circuit means responsive to said temperature sensor and said level sensing means for controlling the operation of said heating means to maintain the solution within a predetermined temperature range and to disable said heating means if the quantity of solution falls below said predetermined level.

7. In a dishwasher including
a washing chamber,
a tank for containing a quantity of washing liquid,
means for heating the liquid in said tank,
temperature sensing means arranged to respond to the temperature of the liquid in said tank for controlling operation of said heating means,
means for spraying the liquid over articles supported in said washing chamber, and
a pump connected to circulate liquid from said tank through said spray means,
the improvement comprising
a float member supported from said tank by a flexure member, said float member responding to the level of liquid in said tank,
electrical means external to said float member and responsive to the presence of said float member in a predetermined upper position, and
means responsive to said electrical means for limiting operation of said heating means when said float member is absent from said predetermined upper position.

8. The dishwasher of claim 7 wherein said flexure member supporting said float members include a bendable central region of reduced cross sectional area.

9. The dishwasher of claim 8 wherein said flexure member is formed from a flexible plastic material.

10. The dishwasher of claim 7 wherein said float member contains a magnet and wherein said electrical means external to said float member includes reed switch means responsive to the proximity of said magnet.

11. The dishwasher of claim 10 wherein said reed switch means is located immediately above the predetermined upper portion of said float member and is responsive to said magnet.

12. The dishwasher of claim 7 wherein said means for limiting the operation of said heating means includes means for terminating operation of said heating means upon departure of said float member from said predetermined upper position for a predetermined time interval.

13. The dishwasher of claim 7 wherein said electrical means responsive to the presence of said float member and said temperature responsive element are mounted in a common enclosure.

* * * * *

UNITED STATES PATENT AND TRADEMARK OFFICE
Certificate

Patent No. 3,846,615                  Patented November 5, 1974

Stuart E. Athey and W. Edwin Thornburg

Application having been made by Stuart E. Athey and W. Edwin Thornburg, the inventors named in the patent above identified, and Hobart Corporation, Troy, Ohio, a corporation of Ohio, the assignee for the issuance of a certificate under the provisions of Title 35, Section 256, of the United States Code, adding the name of William C. Schlieper as a joint inventor, and a showing and proof of facts satisfying the requirements of the said section having been submitted, it is this 20th day of April 1976, certified that the name of the said William C. Schlieper is hereby added to the said patent as a joint inventor with the said Stuart E. Athey and W. Edwin Thornburg.

FRED W. SHERLING,
*Associate Solicitor.*